W. F. RAY.
PROCESS OF APPLYING LUBRICANT TO TIRE CASINGS.
APPLICATION FILED APR. 23, 1919.
1,377,729.
Patented May 10, 1921.
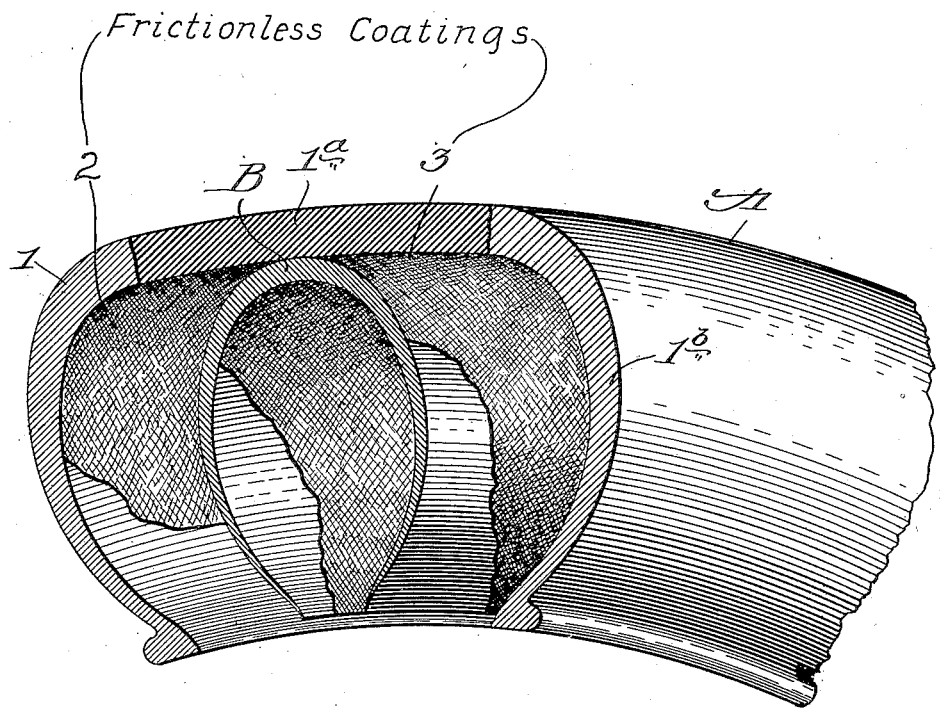

UNITED STATES PATENT OFFICE.

WILLIAM F. RAY, OF CHICAGO, ILLINOIS.

PROCESS OF APPLYING LUBRICANT TO TIRE-CASINGS.

1,377,729.         Specification of Letters Patent.     Patented May 10, 1921.

Application filed April 23, 1919. Serial No. 292,045.

*To all whom it may concern:*

Be it known that I, WILLIAM F. RAY, a citizen of the United States, residing at Chicago, in the county of Cook and State of Illinois, have invented a new and useful Process of Applying Lubricant to Tire-Casings, of which the following is a specification.

This invention relates particularly to pneumatic tires, more especially to pneumatic tires provided with interliners.

The primary object is to provide pneumatic tires and interliners with frictionless coatings, or permanently lubricated surfaces, in order that the outer surfaces of the interliner may move with the utmost freedom with relation to the inner surface of the tire, or casing, thereby avoiding friction and heating, which, as is well known, tends to cause rapid deterioration of the tire.

The invention is illustrated in its preferred embodiment in the accompanying drawing, in which the figure represents a broken sectional perspective view of a pneumatic tire and interliner contained therein, constructed in accordance with the invention.

In the illustration given, A represents the casing of a pneumatic tire; and B represents an interliner within said casing. The numeral 1ª designates the cross-sectional surface of the tire; the numeral 2 designates a longitudinal sectional surface of the casing; and the reference character 1ᵇ designates a cross-sectional surface of the casing.

The inner surface of the casing A has applied thereto a lubricating coating 2 of a lubricating material of the nature hereinafter described. The outer surface of the interliner B has applied thereto a coating 3 of the same lubricating material.

The coating material is preferably a compound provided by mixing, for example, with one pint of gasolene, about three and one-fourth ounces of finely-powdered mica, or a pulverulent compound, composed chiefly of mica, as, for example, 95 to 98% powdered mica and 2% to 5% of powdered soap-stone. The mixture is effected by stirring the powdered mica in the gasolene for a few minutes, thus producing a very thin fluid paint. This is applied as a coating to the inner surface of the casing, as by means of a brush, or in any suitable manner. The same fluid compound is applied to the outer surface of the interliner. If desired, the inner surface of the interliner may be coated in the same manner, thus providing a lubricant coating for the inner surface of the interliner against which the inner tube of the tire bears.

Before applying the coating compound to the surfaces, it is desirable to cleanse the surfaces carefully, to free them from any soapstone or any foreign substance which may adhere. In applying the coating compound, the solution or coating liquid may be thoroughly brushed upon the surface, so that the rubber of the surfaces will be more or less softened, and will become impregnated, as it were, with the mica of the coating. After the coating has been applied, the casing and interliner are dried, and there remains the practically permanent anti-friction coatings, which provide effectually against friction and excessive heating in the use of the tire with the interliner therein. Practical operation has demonstrated the effectiveness of the invention for the purpose set forth.

What I regard as new and desire to secure by Letters Patent is:

1. The method of applying a lubricating coating to a surface of a rubber tire, or the like, which consists in mixing pulverulent mica with gasolene or the like, applying same as a thin liquid paint to the surface, thereby causing softening of the surface and impregnation of the rubber surface by the mica.

2. The method of applying a lubricating coating to a surface of a rubber tire, or the like, which consists in mixing pulverulent mica with gasolene, or the like, applying same as a thin liquid paint to the surface, thereby causing softening of the surface and impregnation of the rubber surface by the mica, and then drying the coated surface.

WILLIAM F. RAY.